May 7, 1968     T. M. SMITH     3,381,550
APPARATUS FOR A TOOL FAILURE DETECTION SYSTEM
Filed June 7, 1965
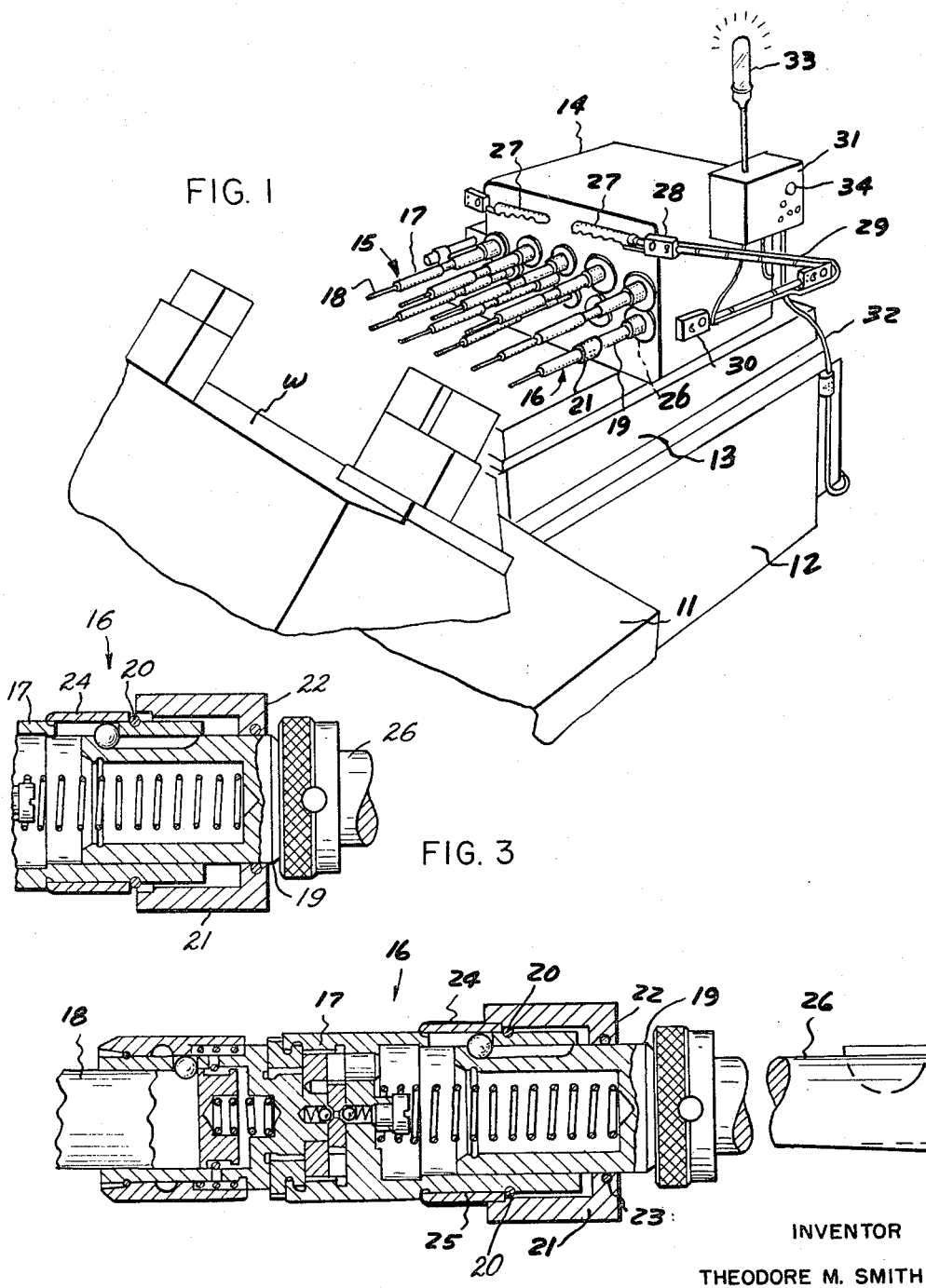
INVENTOR
THEODORE M. SMITH
BY *Cullen, Sloman & Cantor*
ATTORNEYS

United States Patent Office 3,381,550
Patented May 7, 1968

3,381,550
APPARATUS FOR A TOOL FAILURE
DETECTION SYSTEM
Theodore M. Smith, 15639 W. McNicholas Road,
Detroit, Mich. 48235
Filed June 7, 1965, Ser. No. 461,792
11 Claims. (Cl. 77—5)

ABSTRACT OF THE DISCLOSURE

A tool failure detection device for taps, drills, reamers, boring tools, counterborers, and milling cutters, including a first part mounting a tool, a power driven second part connected to a feeding source, with a driving connection between the parts, and adapted for movement relative to each other on failure tool function, with a radioactive impregnated element on one part, and a protective enclosing shield upon the other part normally enclosing said radioactive element, with relative movement on tool failure causing unshielding of the radioactive element adapted to activate a radiation detection signal system.

---

The present invention relates to the use of radioactive isotopes for a method and apparatus in a tool failure detection system.

It is an object of the present invention to incorporate within a compensating toolholder adapted for use in the machine tool industry, including taps, drills, reamers, boring tools, counterborers, and milling cutters and the like, and which incorporates a pair of relatively moving parts and wherein one part mounts a radioactive element and the other part, in normal operating position, mounts a protective enclosing shield therefor and, which upon defect in the function or operation of the tool causes such relative movement between the two parts as to expose the shield and to, thus, operate a remote signal or indicating device.

In the modern automatic transfer line the part or work to be machined is transferred automatically from station to station. At each station, some operation is performed upon the workpiece. For example, a motor block for a modern automobile will be moved automatically to a location, positioned, and clamped into place. Automatic equipment will then drill from one to twenty or thirty holes in the machine block. After this operation has been performed the work will be unclamped and moved on, automatically, to the next station where, for example, some of these holes may be tapped. From the beginning of the transfer line to the end, a hundred or more engine blocks may be working their way along the line. At the final station, an inspector may be located to examine each block.

Assuming, for illustration, a situation where a tool was broken or improperly set at one of the stations, all of the blocks after the station along the transfer line would be defective. Since they are not examined until the end of the line, there may be up to one hundred or more blocks or workpieces coming through which now have to be repaired. This raises the cost of production of each unit. It would be desirable if each station along the transfer line could, in some manner, indicate if anything has gone wrong at that location.

It is therefore, an object of the present invention to provide a compensating type of tap, locator or toolholder, for illustration, where a relative movement of the parts of such tool occurs when something goes wrong with the function or operation of the cutting tool and means are incorporated which respond to this relative movement between the parts of the compensating tool for providing a visual, audible, or other signal indicating trouble.

It is another object to provide a compensating type of toolholder wherein one of two parts slides with respect to a second part. For example, in the case where a hole has not been drilled, and a tapholder presented to such hole at a subsequent station, one of the parts of said compensating holder would telescope with respect to the other if no hole were there to be tapped. Under normal operating conditions the tapholder or other toolholder would not require compensation. Thus, it is the telescoping in the holder of one of the parts in respect to the other which provides for an indication that something is wrong requiring a temporary shutdown of the production line for repairs.

It is, therefore, another object of the present invention to take advantage of this type of design in a compensated type of toolholder, locator or tapholder as the case may be, which employs mechanical and electronic methods which would indicate when such compensation has occurred at the time of occurrence.

It is another object of the present invention to employ or use a radioactive material for accomplishing this result.

It is another object to incorporate a source of radioactive material in any suitable form which is permanently fastened to one of the two relatively movable parts of the compensating holder and to provide a metal shield in the form of a collar which normally covers the radioactive source and which is fastened to the other of the two relatively movable parts. Thus, if for any reason, compensation is required in the tap or toolholder, the holder will telescope causing a relative movement of the shield with respect to the radioactive ring exposing the same in one manner or another so as to trigger a detector in turn operating a warning light or other signal. The reverse is contemplated, i.e., movement of the shield to cover the radioactive element to cut off a signal.

These and other objects will be seen from the following specification and claims in conjunction with the appended drawings in which:

FIG. 1 is a schematic, perspective view of the apparatus uesd in the present tool failure detection system.

FIG. 2 is a fragmentary sectional view of an illustrative form of compensating tool.

FIG. 3 is a further fragmentary section similar to FIG. 2 but with the shield retracted.

It will be understood that the above drawings merely illustrate one embodiment of the invention, without limitation, and that other embodiments within the range of the machine tool industry are contemplated and within the scope of the claims hereafter set forth.

Referring to the drawings, FIG. 1 basically shows, schematically, the tool failure detection system which incorporates a supporting bed 11, which forms the part of an automated production line or transfer line in which parts to be machined are transferred automatically from station to station. In the illustration shown a motor block W is positioned upon bed 11 whereby means not shown it is suitably postioned, located and clamped in place.

Automatic equipment in the form of a bank of work spindles 15 is provided at this particular station which incorporates a supporting multiple spindle head 14 upon a suitable slide support 13 upon the adjacent base 12.

Each of the work spindles 16 includes a first part 17 which fixedly, yet removably, mounts a cutting tool 18, such as a tap, and incorporates a relatively movable part 19 forming a part of the compensating toolholder and which is associated with the spindle head 14 which incorporates means as at 26 for effecting power rotation of the tools 18 and for providing feed movements thereof in a conventional manner.

Each of the respective compensating type of toolholders, locators or tapholders are shown schematically and in further detail in FIG. 2 and wherein a first part 17, mounts the tool, which in his case, may be a tap 18 and which is suitably keyed or otherwise connected to the power driven, longitudinally movable tube 19 forming a part of the compensating toolholder. Upon first part 17, in the illustrative embodiment, there is a radioactive ring 20 fixedly secured thereto and which is rendered radioactive by the use of any one of a group of radioactive isotopes of low radiation value up to approximately 500 microcuries, more or less, for illustration, but not by way of limitation.

A shield or mask 21 in the form of a collar and flanged at 22 is frictionally, yet movably, mounted upon and with respect to the power driven and longitudinally movable drive shaft 19–20 by means of the split friction ring 23 nested within flange 22. In the relative position of the parts shown in FIG. 2, the forward portion of the shield overlies and protectively encloses radioactive ring 20 preventing emission of radioactive rays.

FIG. 2 shows the normal relative position of the parts in the compensating type of tool and wherein upon a malfunction or breakage of tool element 18 there will be a relative longitudinal movement of shaft 19 or second part with respect to the first part 17. In the normal inoperative position of the parts mask 21 is bearing against ball race 24 anchored at 25, upon first part 17. Accordingly, there is no longitudinal movement of the shield, but shaft 19 moves relatively to said shield and with respect to friction ring thereon. On normal spring biased retracting movement of shaft 19 relative to part 17, spring 23 expands and due to frictional contact with shaft 19 causes a withdrawing movement of said shield with respect to the radioactive isotope impregnated ring 20 exposing the same to radiation detector 27, FIG. 1.

Such radiation detector 27, of which there may be one or more, is universally mounted as at 28 upon the articulated support elements 29, which are flexibly anchored at 30 upon head 14 and are adapted for universal movement as desired for correct set up positioning.

The present tool failure detection system includes certain electronic mechanism forming no part of the present invention but which is designated as a unit at 31, including power source 32, signal light 33, which could also include an audible signal if desired, and a reset button 34.

The Geiger tube type of detector 27 senses the exposure of radioactive retaining ring 20 whenever the tool breaks, cannot operate properly or, otherwise fails to function. The increase in detector count rate causes the electronic circuitry to deflect a meter relay in the detection system generally indicated at 31, which electrical circuit forms no part of the present invention, for activating an alarm relay and in turn energizing the alarm light 33 or other signal.

The present invention is not directed to the structure or function or operation of the specific Geiger tube detector and its electronic circuitry for actuating signal light 33, but more particularly to a compensating type of toolholder which upon malfunction provides a means for exposing a radio-isotope impregnated element to give a signal, which signal is given to the tool failure detection system 27, 31. The reverse operation is regarded as equivalent. The radioactive element may be normally uncovered to deliver a signal during proper operation, and upon malfunction is covered by the movable shield to cut off the signal.

The electronic parts 27–31 are provided and sold by Eberline Instrument and others. The circuitry and construction thereof form no part of the present compensating tool in such a tool failure detection system.

In the illustrative embodiment the sealed source of radioactive radiation should be such that one-quarter of an inch, for illustration, of the metal shield or other equivalent shield 21 will give an alternation of one thousand. There is thus employed in connection with the radioactive ring 20 beta radiation or low energy gamma radiation. Sources of these may be as follows: strontium-90, cerium-144, krypton-185, thallium-204, radium D, and radium E, by way of illustration only and not by way of limitation since it is contemplated that other nuclides may be suitable for this purpose in the low energy range.

The method taught and incorporated and suggested in connection with the present invention provides in the use of radioactive isotopes a tool failure detection system for compensating type of tools, which normally include a pair of relatively movable parts and which consists of the following items:

(1) Mounting a radioactive or radio-isotope impregnated element upon one of a pair of relatively movable parts.

(2) Mounting the other part of the compensating tool for movement relative to said one part on failure of function of one of the parts.

(3) Normally shielding the radioactive element by means secured or joined to one of the relatively movable parts whereby movement of one part relative to the other unshields the radioactive element and wherein the rays or radiation from said element are adapted to energize a radiation detection signal system.

The radioactive element could be any by-product material which incorporates atomic numbers in any range, in the low energy group preferably and, by way or illustration, up to 500 microcuries, but not limiting thereto.

In the present invention there is shown, only by way of illustration, one form of a compensating type of tool which would be employed in a machine tool involved either for taps, drills, reamers, counterbores, milling cutters, boring tools, and the like and wherein it is the relative movement of one part with respect to the other due to a malfunction or other destruction of the cutting element rendering the same inoperative, which causes an unshielding or shielding of the radioactive source in such a manner as to provide a visual signal through a tool failure detection system of the type which incorporates a Geiger or other type of detector, as shown schematically at 27–31, FIG. 1.

While the illustrative embodiment in FIG. 2 shows schematically one form of compensating type of tool contemplating relative movement of one part with respect to the other, it is contemplated as part of the present invention that one of the relatively movable parts will mount a radioactive or radio-isotope impregnated source such as a ring, or other shape and the other relatively movable part will mount an enclosing shield which in normal functioning of the toolholder, such as a tap, will protectively enclose the said radioactive element, but which upon a relative movement of the parts will cause an exposure of the radioactive element which will be responded to by the Geiger tube detector assembly used in conjunction therewith.

Having described my invention, reference should now be had to the following claims. I claim:

1. The method of providing a tool failure detection system for taps, drills, reamers, boring tools, counterbores, and milling cutters, including a first part mounting a tool adapted to engage a workpiece and a relatively movable second part connecting the first part to a source of power and feed;

mounting said second part for a longitudinal movement relative to said first part on failure of function of said tool;

mounting a radioactive element upon said first part;

normally shielding the radioactive element;

movement of the second part relative to the first part unshielding said radioactive element;

the rays of said radioactive element adapted to energize a radiation detection signal system.

2. A tool failure detection device for use with taps, drills, reamers, boring tools, counterbores, and milling cutters;

a first part mounting a tool adapted to operatively engage a piece of work;
a second part connected to a source of power and feed;
means for mounting the second part for operative driving engagement with said first part and for movement relative to the first part on failure of function of said tool;
a radioactive impregnated element mounted upon one of said parts;
and a shield mounted upon the other of said parts normally protectively enclosing said element;
relative movement of said parts moving said shield to uncover said radioactive element;
the rays from said element adapted to energize a radiation detection signal system.

3. In the device of claim 2, said radioactive element being selected from the group consisting of beta radiation, and low energy gamma radiation.

4. In the device of claim 2, the radioactive element being selected from the group consisting of strontium-90, cerium-144, krypton-185, tallium-204, radium D, and radium E.

5. In the device of claim 2, said radioactive element consisting of any by-product material with atomic numbers in any range.

6. In the device of claim 2, said radioactive element containing up to 500 microcuries.

7. In the tool failure detection device of claim 2, said shield normally exposing said radioactive element;
said relative movement causing said shield to cover the radioactive element.

8. In the tool failure detection device of claim 2, said element mounted upon first part;
said shield mounted upon second part.

9. In the tool failure detection device of claim 2, said element being in the form of a ring mounted on one part;
said shield being in the form of a flanged collar of increased internal diameter mounted upon the other part.

10. In the tool failure detection device of claim 2, said element being in the form of a ring mounted on one part;
said shield being in the form of a flanged collar of increased internal diameter mounted upon the other part;
and slidably and frictionally mounted upon said second part and normally bearing against the said first part;
initial relative movement of said second part relative to said first part being also relative to said shield;
subsequent retracting movement of said first part to normal position frictionally withdrawing said shield.

11. In the tool failure detection device of claim 2, said element being in the form of a ring mounted on one part;
said shield being in the form of a flanged collar of increased internal diameter mounted upon the other part;
and slidably and frictionally mounted upon said second part and normally bearing against the said first part;
initial relative movement of said second part relative to said first part being also relative to said shield;
subsequent retracting movement of said first part to normal position frictionally withdrawing said shield;
the connection between said shield and said second part including an extensible split friction ring nested within the shield.

References Cited
UNITED STATES PATENTS 1,902,762    3/1933    Conlon _____ 77—5.2
3,235,726    2/1966    Haller _____ 250—106 X FRANCIS S. HUSAR, *Primary Examiner.*